US011003303B2

(12) United States Patent
Kruse et al.

(10) Patent No.: US 11,003,303 B2
(45) Date of Patent: May 11, 2021

(54) LAYERED IDEA MAPPING

(71) Applicants: Andres Kruse, Stonyhurst (GB); Elaine Kruse, Stonyhurst (GB)

(72) Inventors: Andres Kruse, Stonyhurst (GB); Elaine Kruse, Stonyhurst (GB)

(*) Notice: Subject to any disclaimer, the term of this patent is extended or adjusted under 35 U.S.C. 154(b) by 0 days.

(21) Appl. No.: 16/699,251

(22) Filed: Nov. 29, 2019

(65) Prior Publication Data

US 2020/0174651 A1    Jun. 4, 2020

(30) Foreign Application Priority Data

Nov. 29, 2018 (GB) .................................. 1819485

(51) Int. Cl.
| | | |
|---|---|---|
| *G06F 3/0481* | (2013.01) | |
| *G06F 3/0484* | (2013.01) | |
| *G06F 3/0482* | (2013.01) | |
| *G06N 5/02* | (2006.01) | |
| *G06F 40/166* | (2020.01) | |
| *G06F 40/30* | (2020.01) | |

(52) U.S. Cl.
CPC .......... *G06F 3/0481* (2013.01); *G06F 3/0482* (2013.01); *G06F 3/04847* (2013.01); *G06F 40/166* (2020.01); *G06F 40/30* (2020.01); *G06N 5/02* (2013.01); *G06F 2203/04803* (2013.01)

(58) Field of Classification Search
CPC .. G06F 3/0481; G06F 40/166; G06F 3/04847; G06F 3/0482; G06F 2203/04803; G06F 40/103; G06F 40/30; G06F 3/04817; G06F 16/26; G06N 5/02; G06Q 10/10; G06Q 10/06311
See application file for complete search history.

(56) References Cited

U.S. PATENT DOCUMENTS

| | | | | |
|---|---|---|---|---|
| 5,506,937 A | * | 4/1996 | Ford ...................... | G09B 23/28 706/11 |
| 5,666,503 A | * | 9/1997 | Campanelli ............. | G06T 11/60 715/853 |
| 6,031,537 A | * | 2/2000 | Hugh .................... | G06F 16/904 715/854 |
| 6,256,032 B1 | * | 7/2001 | Hugh .................... | G06F 16/904 715/854 |
| 7,730,429 B2 | * | 6/2010 | Kruse ................... | G06F 3/0481 715/855 |
| 10,346,138 B1 | * | 7/2019 | Quillen ............... | G06F 16/9024 |
| 2007/0099162 A1 | * | 5/2007 | Sekhar .................. | G06Q 10/10 434/323 |

(Continued)

*Primary Examiner* — Nicholas Ulrich

(57) ABSTRACT

Apparatus, system and computer-implemented method for arranging, organising and mapping ideas or planning processes in a graphical workspace for idea management. This includes a graphical user interface (GUI) with an idea map window and a word processor document window. The idea map represents ideas as a hierarchical network of nodes and links. Selection of a subset of the ideas to be shown as a separate idea map layer, wherein the ideas of the subset have different positions, different links and relationships to the ideas displayed in the main idea map, thus creating a different layout and mapping representation; and display a separate word processor document associated with only the ideas of the subset and the relationships inside the separate idea map layer.

9 Claims, 7 Drawing Sheets

(56) References Cited

U.S. PATENT DOCUMENTS

| | | | | |
|---|---|---|---|---|
| 2008/0046987 | A1* | 2/2008 | Spector | G06F 21/604 |
| | | | | 726/6 |
| 2016/0210268 | A1* | 7/2016 | Sales | G06F 3/04842 |
| 2018/0366013 | A1* | 12/2018 | Arvindam | G06F 40/205 |

* cited by examiner

5. Themes and Ideas

5.1. Appearance and Reality

Allied to the question of Hamlet's madness is a variety of references to the idea of acting a part or of presenting a false image to the world. Hamlet demands honesty, but is he himself always honest? Many other characters, at various times, seem to be playing parts, and the troupe of players is in the play as an active reminder that in real life a person can play many roles, and it is not always easy to tell what is true from what only appears to be true. At the very center of the play is Hamlet's view of acting on the stage, expressed in his advice to the players.

You can compare it with the picture Shakespeare gives of Hamlet, and the other characters, acting in their 'real' lives.

5.2. Madness and Sanity

The question of Hamlet's sanity is openly discussed in the play and has been a subject of debate for centuries. Is Hamlet really mad? If so, what causes Hamlet's madness? Is it his reluctance to take revenge? Is it his confused feelings about his mother? Is he in fact sane and the world mad for failing to understand the things he says? Is he sometimes pretending to be mad and at other times genuinely unbalanced? Remember, the play gives another example of madness in Ophelia, and you should ask some of the same questions about her.

5.3. Kingship

Shakespearean tragedy often turns on the question of who is to be king—on who is best qualified to accept both the privileges and the responsibilities of rule.

As you read Hamlet, keep in mind these questions: What are the obligations of a king to his people? Who in Hamlet has the most right to be king? Who is most qualified to be king? Is an honest king necessarily the best king? Is a peaceful king better than a warlike one? How much say should the public have in choosing a king, and how much the nobility? In the scene-by-scene discussion we'll also take a look at what being king means to each of the four characters who claim the Danish throne—Claudius, Hamlet, Laertes, and Fortinbras—and how well each one would rule.

5.4. Justice and Revenge

All the action of Hamlet is based on the one task the ghost sets the prince: to avenge his father's murder. This powerful demand is countered in Hamlet's mind by three questions: Is revenge a good or an evil act? Is Claudius truly guilty and so to be punished? Is it Hamlet's responsibility to punish him? Throughout the play Shakespeare raises questions about whether justice is to be left to the state or taken into one's own hands, and about whether it is possible, in a cunning and deceitful world, to tell the good man from the criminal. These questions are focused on Hamlet, who must decide whether to avenge his father or not, and if so, how. They are reflected in the parallel stories of Fortinbras and Laertes, who also have obligations of revenge to fulfill.

Idea Visibility / Layer

| Title | Type | Status | 0:default | 1.5 acts | 2women | 3:men |
|---|---|---|---|---|---|---|
| Hamlet | Text | ☺ unknown | ☑ | ☐ | ☐ | ☐ |
| Characters | Text | ☺ unknown | ☑ | ☐ | ☐ | ☐ |
| Gertrude | Text | ☺ unknown | ☑ | ☐ | ☑ | ☐ |
| Ophelia | Text | ☺ unknown | ☑ | ☐ | ☑ | ☐ |
| Horatio | Text | ☺ unknown | ☑ | ☐ | ☐ | ☑ |
| The Ghost | Text | ☺ unknown | ☑ | ☐ | ☐ | ☐ |
| Hamlet | Text | ☺ unknown | ☑ | ☐ | ☐ | ☑ |
| Shakespeare's ... | Text | ☺ unknown | ☑ | ☐ | ☐ | ☐ |
| Themes and Id... | Text | ☺ unknown | ☑ | ☐ | ☐ | ☐ |
| The Plot | Text | ☺ unknown | ☑ | ☐ | ☐ | ☐ |
| Madness and S... | Text | ☺ unknown | ☑ | ☐ | ☐ | ☐ |
| Kingship | Text | ☺ unknown | ☑ | ☐ | ☐ | ☐ |
| Justice and Rev... | Text | ☺ unknown | ☑ | | | |

LAYERED IDEA MAPPING

FIELD OF THE INVENTION

This invention relates to an apparatus and computer-implemented method for arranging, organising and mapping ideas or planning processes in a graphical workspace for idea management.

BACKGROUND OF THE INVENTION

Anybody who has ever written an essay (or the like) has grappled with the task of organizing various abstract ideas into a coherent linear written document. Along with style and content, the organization of a written document typically determines its effectiveness. The difficulty of this task may vary, even between people of similar intelligence, because of innate differences in how people think or view the world.

For example, spatial and sequential thinking are two different mental organizations that affect the way people view the world. Sequential thinking can be conceptualized as step-by-step linear thinking over time. By contrast, spatial thinking can be conceptualized as an holistic system in which all knowledge is interconnected in space. Auditory thinking is typically associated with sequential thinking and visual thinking is typically associated with spatial thinking. Historically, most teaching methods, presentation styles, and productivity tools have been developed for those people who are best suited to think and receive information in a sequential manner. However, dyslexics and others are believed to be typically better suited for receiving or compiling information spatially instead of sequentially. Moreover, such spatial thinkers are believed to constitute some of the most creative and entrepreneurial individuals in society. The present inventors have recognized that spatial thinkers can benefit from more effective tools that service their spatial thinking style and that interrelate their spatial thinking style with sequential documents. The present inventors have also recognized that sequential thinkers can also benefit from such tools—although creating well-organized linear documents may be easy for such individuals, they may still find it difficult to see the "big picture."

U.S. Pat. No. 7,730,429 Graphical workspace for idea management describes how idea mapping may be represented in software. In general icons or "ideas" are created on a graphical workspace, each idea has an associated piece of text and can be linked to other ideas. There is an algorithm, which then uses the structure of the idea map and collates all those ideas into a final text document.

SUMMARY OF THE INVENTION

A first aspect of the invention provides a computer-implemented method comprising:

providing a graphical user interface including an idea map window for displaying and editing a graphical representation of a hierarchical network of nodes, in a main map;

wherein, the nodes representing ideas, and links between ones of the nodes, the links representing relationships between the ideas;

providing a word processor document window for displaying information associated with the hierarchical network in a word processor document, the displayed information organized in a sequence obtained by hierarchically processing any linked children nodes in either a clockwise or an anticlockwise manner as displayed about their respective parent nodes in the hierarchical network; and arranging a subset of the ideas to be shown as a separate idea map layer, wherein the ideas of the subset have different positions, different links and relationships to the ideas displayed in the main idea map, thus creating a different layout and mapping representation; and displaying a separate word processor document associated with only the ideas of the subset and the relationships inside the separate idea map layer.

The method may further include concurrently displaying the idea map window and the word processor document window.

The method may further include automatically updating the word processing document window with information from any changes in the idea map window.

The graphical representation may be a two-dimensional (2D) graphical representation.

The method may further provide an idea map layers editor for creating, deleting and editing idea map layers of a new layer in a straightforward manner, The method may further allocate each idea map layer with a number and a name.

The method may further select an idea map layer to be displayed in the idea map window and the layer's corresponding text to be displayed in the word processor document window.

The method may further include a node-layer relationship matrix editor to select the visibility or association of ideas, nodes on layers.

A second aspect of the invention provides a non-transitory computer-readable storage medium having stored thereon computer-readable code, which, when executed by computing apparatus, causes the computing apparatus to perform the methods above.

A third aspect of the invention provides an apparatus, comprising:

an input module for receiving textual and graphical input from a user;

an output module for displaying a graphical workspace with a graphical user interface (GUI), the GUI comprising:

an idea map window configured for displaying and editing a graphical representation of a hierarchical network of nodes, the nodes representing ideas, and links between ones of the nodes, the links representing relationships between the ideas;

a word processor document window configured for displaying information associated with the hierarchical network in a word processor document; and an interface between the idea map window and the word processor document window, the interface organizing information displayed in the word processor document window in a sequence obtained by hierarchically processing nodes in the idea map window, the hierarchically processing including locating any displayed linked children nodes in either a clockwise or an anticlockwise manner about their respective parent nodes in the hierarchical network, means for arranging a subset of the ideas to be shown as a separate idea map layer, wherein the ideas of the subset have different positions, different links and relationships to the ideas displayed in the main idea map, thus creating a different layout and mapping representation; and means for displaying a separate word processor document associated with only the ideas of the subset and the relationships inside the separate idea map layer.

The apparatus may further include an idea map layers editor for creating, deleting and editing idea map layers of a new layer in a straightforward manner, The apparatus may further allocate each idea map layer with a number and a name.

The apparatus may further select an idea map layer to be displayed in the idea map window and the layer's corresponding text to be displayed in the word processor document window.

The apparatus may further provide a node-layer relationship matrix editor to select the visibility or association of ideas, nodes on layers.

A forth aspect of the invention provides a computerized system comprising:

a graphical user interface (GUI), the GUI comprising:

an idea map window configured for displaying and editing a graphical representation of a hierarchical network of nodes, the nodes representing ideas, and links between ones of the nodes, the links representing relationships between the ideas;

a word processor document window configured for displaying information associated with the hierarchical network in a word processor document; and an interface between the idea map window and the word processor document window, the interface organizing information displayed in the word processor document window in a sequence obtained by hierarchically processing nodes in the idea map window, the hierarchically processing including locating any displayed linked children nodes in either a clockwise or an anticlockwise manner about their respective parent nodes in the hierarchical network;

means for arranging a subset of the ideas to be shown as a separate idea map layer, wherein the ideas of the subset have different positions, different links and relationships to the ideas displayed in the main idea map, thus creating a different layout and mapping representation; and means for displaying a separate word processor document associated with only the ideas of the subset and the relationships inside the separate idea map layer.

BRIEF DESCRIPTION OF THE DRAWINGS

The invention will now be described by way of example only with reference to the accompanying drawings in which:

FIGS. 3 and 4 shows enlarged versions of the representations of FIG. 2;

FIG. 7 shows how the idea visibility may be selected in accordance with the invention.

DESCRIPTION OF THE INVENTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

This invention relates to an apparatus and computer-implemented method for arranging, organising and mapping ideas or planning processes in a graphical workspace for idea management.

In the art, subjects, concepts, characters, creative matter, or the like, which in this invention will be collectively be referred to as ideas, may be represented as icons in a graphical workspace software for idea management.

The graphical workspace software in this invention may be referred to also as an idea mapper program, an idea mapper or simply a program, for short.

Furthermore, the ideas and their inter-relations can be represented and shown on the same graphical workspace. Each idea has an associated piece of text and can be linked to other ideas, thus creating and presenting a map For ease of visualisations shapes represent ideas on the same common link and/or inter-link. An algorithm, which then uses the structure of the idea map and collates all those ideas into a final text document.

The invention presented here is an extension of such idea mapper. The invention proposes to add the ability to edit within the same program multiple maps that have the same ideas in them but within a completely different layout.

Figure 1:
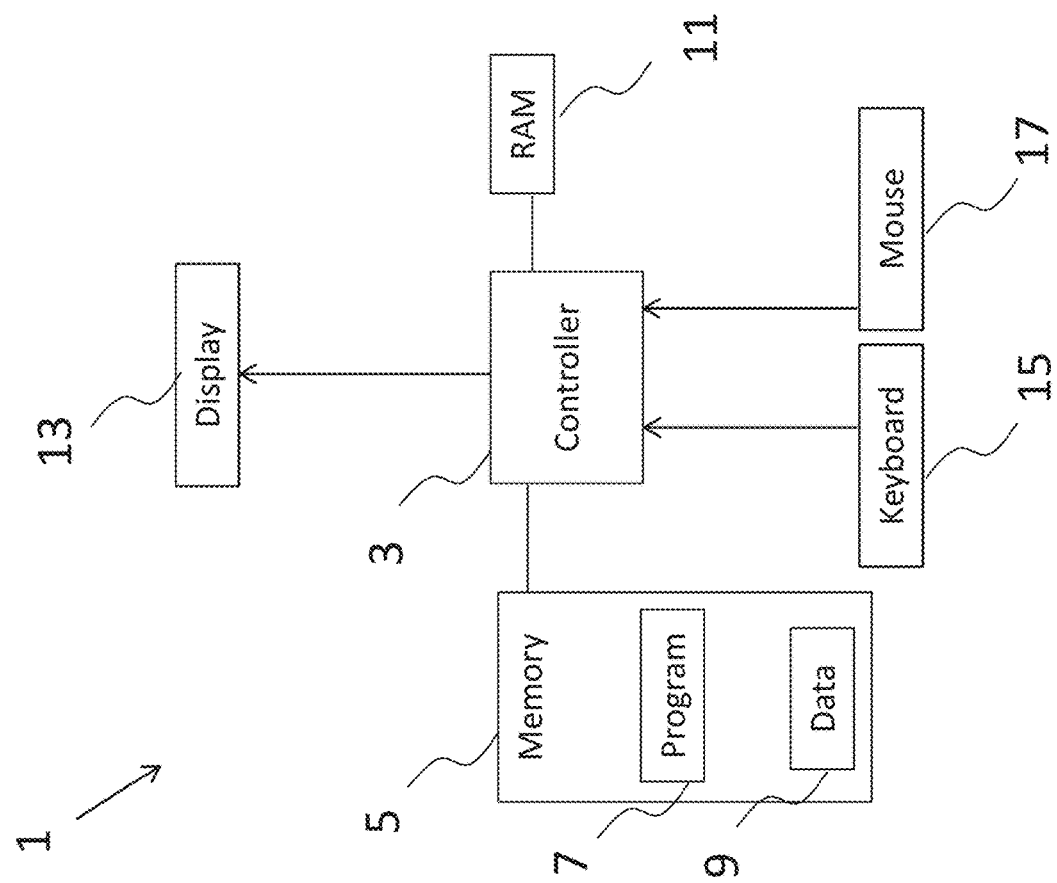
FIG. 1 is a schematic block diagram of functional components of a computer system.

Referring to FIG. 1, the main functional components of a computer system apparatus 1 are shown, comprising a controller 3, a memory 5 storing programs 7 and data 9, RAM 11, an output display 13, a keyboard 15 and a mouse 17.

The apparatus 1 may take any suitable form, e.g. a PC, laptop or PDA. It may also be a smart phone or data tablet (which will include data communications functionality) and may have a touch-screen interface with the display 13 instead of a mouse input device. It will be understood that the keyboard 15 may be a hard key device or one which is presented as a GUI on the display 13 for touch screen interaction.

The controller 3 is connected to each of the other components to control operation thereof, and is typically a microprocessor or plural microprocessors but may also be a microcontroller.

The memory 5 may be a non-volatile memory such as read only memory (ROM), a hard disk drive (HDD) or a solid state drive (SSD). The memory 5 stores amongst other things an operating system program and other software programs, including a paragraph structuring program. The paragraph structuring program is hereafter represented by module block 7. RAM 11 is used by the controller 3 for the temporary storage of data 9. The operating system and idea mapper program 7 contain code which, when executed by the controller 3 in conjunction with the RAM 11, controls operation of at least some of the hardware components.

The idea mapper program 7 is configured to be run either as a stand-alone application or as an 'add on' application for use with conventional text editor programs (e.g. Microsoft Word).

The idea mapper program 7 can be implemented on a standalone device (e.g., on a personal computer using Microsoft Windows, Apple OS, Linux or another operating system), in a client-server environment (e.g., using a web browser), or any other manner.

Figure 2:
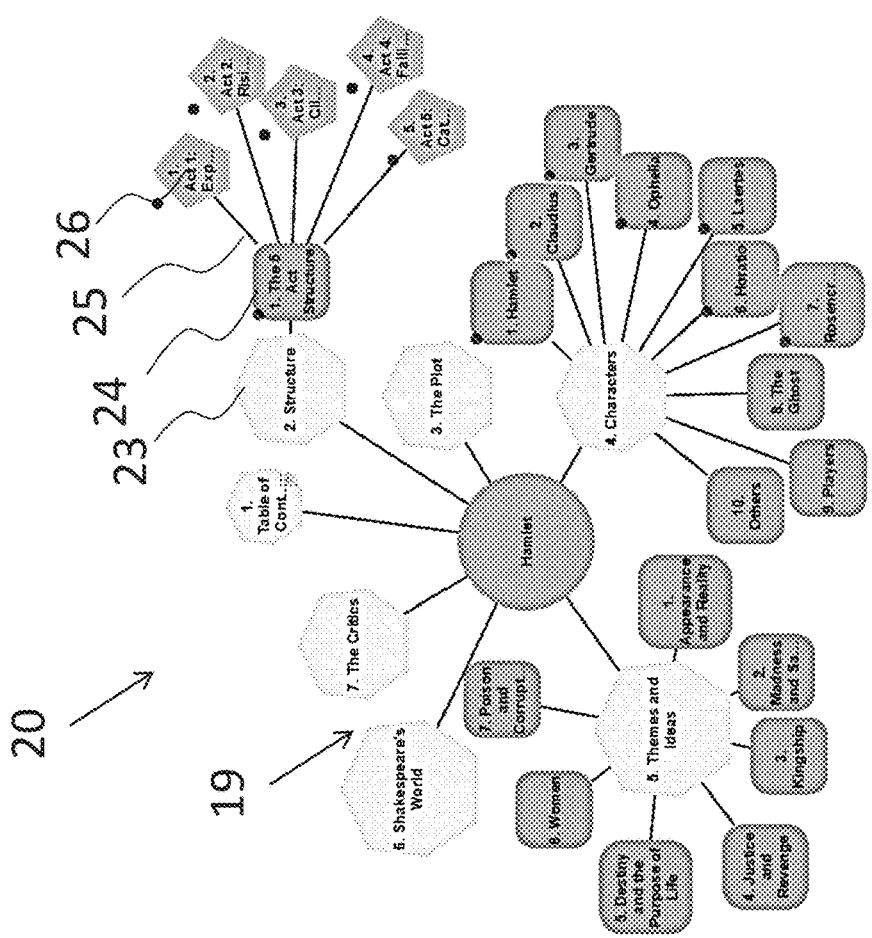
FIG. 2 shows an illustration of a graphical workspace for idea management, in the current state of the art, showing a dual graphical and text editor representation.

FIG. 2 is a screenshot section of the idea mapper program 7. In this example, a display window 20 includes two sub-windows: a word processor document window 21 and an "idea map" window 22. The word processor document window 21 is also referred to as a "text view," or editor window, although, like other typical word processor documents, it can also incorporate non-textual information, such as graphical or audiovisual images. The "idea map" window 22 provides a graphical workspace for idea management, showing a main idea map 19, which can be displayed concurrently with the word processor document or editor window 21. However, the word processor document window 22 and the idea map window 22 need not be displayed concurrently, as for example shown in FIGS. 3 and 4.

A user with a spatial thinking preference can capture and organize ideas graphically using the idea map window 22. Then, such graphically-created or organized ideas are automatically converted into a textual outline or other sequential representation in the editor window 21. In this manner, the editor window 21 and the idea map window 22 are able to provide different representations of the same project.

The following example will first show how the software in the current state of art currently deals with idea maps, followed by the proposed invention of an advanced layered idea map.

The idea map window 22 represents ideas in a network, such as a hierarchical network. One example of the hierarchical network can be conceptualized as including nodes, representing ideas, and links between such nodes, representing relationships between the ideas. In this example of the hierarchical network, one particular node forms the "root" node 23 to which a number of other dependent nodes 24 are connected via links 25. These dependent nodes 24 may, in turn, be connected to other root nodes 23, or create their own clusters with further sub-dependent nodes 26. In a hierarchical network, there is typically only one link from one node to another node. Some other examples of analogous hierarchical networks include: a computer file system, in which a node is a directory, and a link represents the containment of a subdirectory in a directory; inheritance relationships, in which a node represents a person, and a link represents a parent-child relationship; an idea or concept map, in which a node contains textual information (e.g., representing an idea or concept) and the link signifies containment; and database index trees.

FIG. 2 shows for example how a sample essay on the play "Hamlet" is represented in the current art. In this example all ideas which form the final document are visible.

Referring to FIG. 2, the graphical representation may also be shown in conjunction with collated text arranged in paragraphs, wherein every paragraph may correspond to a specific idea icon, which may be any type of node. The program allows the user to see the collated text document when the split view is activated.

Figure 3:
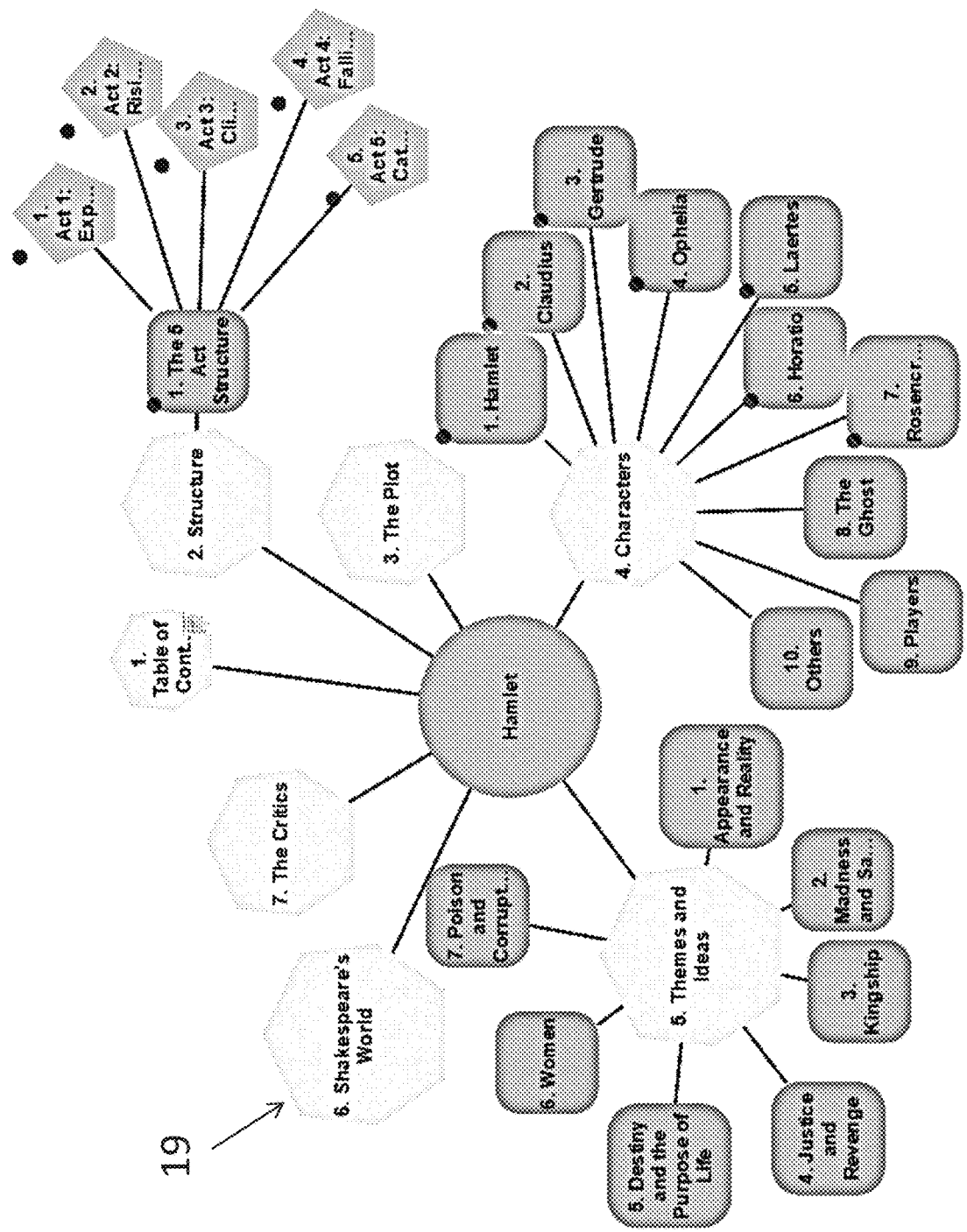

FIGS. 3 and 4 represent zoomed or single view versions of the windows.

Referring again to FIGS. 2, 3 and 4, the editor window 21 on the right side, the order in which the individual nodes, "ideas", are collated is using a clockwise recursive algorithm, so starting at root node "table of contents", then other root node "Structure" and inside root node "Structure", in the first section is a dependent node "The 5 act structure", which then has sub-dependent nodes "Act 1", "Act 2" and so on.

However, there are limitations to this representations.

Referring again to the essay or literature creation of "Hamlet", and suppose the user wants to prepare a presentation or extract but use only the sections of text that relate to characters of the male gender, i.e. a map "idea" or node for "men". In that case the user would have to copy-paste the relevant ideas into an empty document, which is not different or any more efficient than if the user were to use a text processor, where again they would have to copy-paste the relevant paragraphs into an empty document.

This method is usable but not efficient, it also poses major limitations when the structure becomes more complex and entangled. While this is workable, the problem arises if any changes are made to the ideas. In that case the user would have to copy-paste any changes back into the original document and vice versa.

Figure 5:
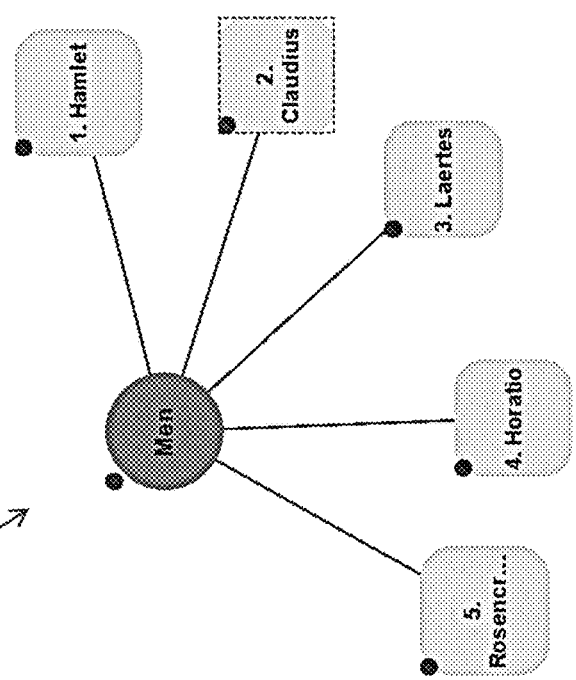
FIG. 5 shows an illustration of the representation of the ideas in accordance with the invention, wherein a subset of the ideas may be shown on a separate map "layer" and within this separate layer for all ideas to have different positions and also be connected to each other differently thus creating a completely different layout.

FIG. 5 shows an illustration of the representation of the ideas in accordance with the invention, wherein a subset of the ideas may be shown on a separate map "layer" and within this separate layer for all ideas to have different positions and also be connected to each other differently thus creating a completely different layout.

In more detail, the invention proposes the ability to show a subset of the ideas on a separate map "layer" 29. Within this separate layer, all ideas may have different positions and connections. By being connected to each other differently the ideas create a completely different layout and mapping representation. The resulting linear text document in the editor window 21 then shows the ideas collated in a different order.

The user can then switch from one layer to the other and edit the ideas within each layer. However because they are the same ideas any change made in one layer will also be visible in the other.

For example consider a layer that only contains the ideas relating to "men" in the essay on Hamlet.

Any change to the text in node "Claudius" would then also be present in the "main map" 19 which contains all the ideas. Note in FIG. 5 that on the right hand side, editor window 21, only ideas that are present on the layer map 29 are shown and their order is given by using the same clockwise recursive algorithm.

So each layer 29 has a different set of ideas and the position where the ideas are on the map on view and how they are connected to each other is different, thus resulting in a different collated text.

Another embodiment of the invention would be the use of an idea map as a project planning tool where the project is broken down into many different tasks, each potentially assigned to a different person. The map could become very large and it would be very difficult to see the tasks related to a single person, even if tags or colours were used.

Communicating the project plan to members of the team would also be very difficult because each member would see the entire plan.

In this case layers could be created, wherein each layer related to the tasks for a particular person and on those layers only the tasks assigned to that person would be visible.

Figure 6:
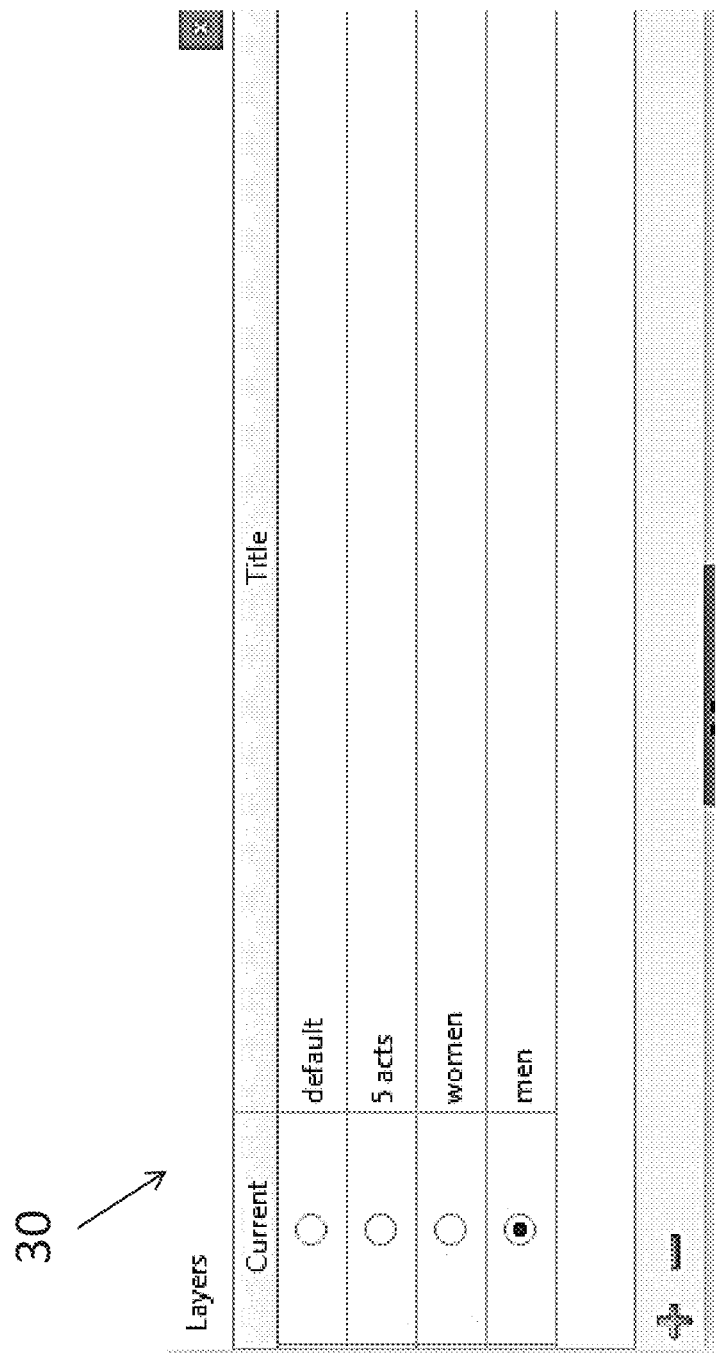
FIG. 6 shows a layer data representation and selector in accordance with the invention.

Referring now to FIG. 6, a layer data representation and selector in a layer editor 30 is shown in accordance with the invention.

As can be seen in FIG. 6, layer editor 30 can be used to create, delete and edit of a new layer in a straightforward manner, wherein each layer is allocated with a number and a name.

Layer editor 30 shows a list of different layers and means to selected a "current" layer, i.e. the layer which may be shown in the layer map, shown in the current document window.

FIG. 7 shows a means to arrange a node-layer relationship matrix 40 or colloquially referred to as an idea visibility, in accordance with the invention.

The node-layer relationship matrix 40 comprises means to select the visibility of any type of node, be that root, dependent, sub-dependent, etc.

The node-layer relationship matrix 40 comprises means to select the visibility or association of ideas, nodes on layers.

For example, in FIG. 7 can be seen that ideas or nodes relating to "women" are visible on the default layer, i.e. main map and the "women" layer, whereas the ideas or nodes relating to "men" are visible on the main map and "men" layer.

The invention claimed is:

1. A computer-implemented method comprising:
providing a graphical user interface including an idea map window for displaying and editing a graphical representation of a hierarchical network of a plurality of nodes, and a plurality of links between at least one of the plurality of nodes, wherein the plurality of nodes represent a superset of ideas and the plurality of links represent relationships between the superset of ideas, wherein the superset of ideas are simultaneously arrangeable in multiple subsets of ideas and in at least one separate idea map layer providing a first word processor document window for displaying information associated with the hierarchical network in the first word processor document, the information organized in a sequence obtained by hierarchically processing any linked children nodes in either a clockwise or an anticlockwise manner as displayed about their respective parent nodes in the hierarchical network;

arranging at least one of the multiple subset of ideas to be shown as a separate idea map layer;

wherein at least one of the multiple subset of ideas have different positions, different links and different relationships to the superset of ideas displayed in the idea map window, thus creating a different layout and mapping representation;

displaying a second word processor document associated with the at least one of the multiple subset of ideas and relationships inside the separate idea map layer, wherein the second word processor document shows at least one of the multiple subset of ideas collated in different order to the separate idea map layers or the idea map window; and switching from one idea map layer to another idea map layer, wherein editing the ideas within each idea map layer causes any changes made in one idea map layer to also be visible in any other idea map layer and in a corresponding second word processor document.

2. The method of claim 1, further comprising concurrently displaying the idea map window and a window of the second word processor document.

3. The method of claim 1, further comprising automatically updating a window of the second word processing document with information from any changes in the idea map window.

4. The method of claim 1, wherein the graphical representation is a two-dimensional graphical representation.

5. The method of claim 1, further comprising an idea map layers editor for creating, deleting and editing separate idea map layers.

6. The method of claim 1, further comprising allocating each separate idea map layer with a number and a name.

7. The method of claim 1, further comprising selecting a selected idea map layer to be displayed in the idea map window and text corresponding to the selected idea map layer to be displayed in a window of the second word processing document.

8. The method of claim 1, further comprising a node-layer relationship matrix editor to select visibility or association of ideas and nodes on layers.

9. A non-transitory computer-readable storage medium having stored thereon computer-readable code, which, when executed by computing apparatus, causes the computing apparatus to perform the method of claim 1.

* * * * *